Aug. 4, 1953  G. J. SELVIN  2,647,557
HEAT SEALING APPARATUS
Filed July 25, 1950  3 Sheets-Sheet 1

INVENTOR.
GERALD J. SELVIN
BY
Roland A. Anderson
Attorney

Aug. 4, 1953
G. J. SELVIN
2,647,557
HEAT SEALING APPARATUS
Filed July 25, 1950
3 Sheets-Sheet 2
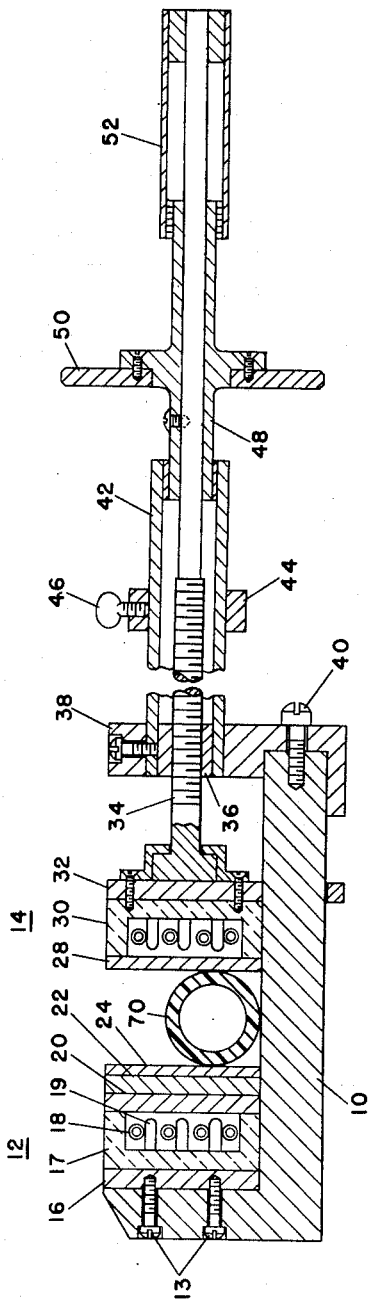
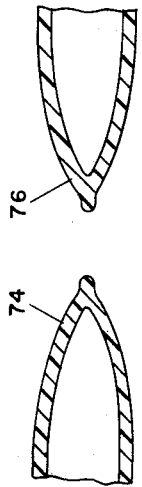
FIG. 4.
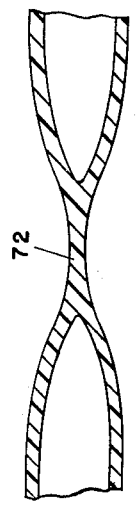
FIG. 3.
*INVENTOR.*
GERALD J. SELVIN
BY Aug. 4, 1953

G. J. SELVIN 2,647,557

HEAT SEALING APPARATUS

Filed July 25, 1950

INVENTOR.
GERALD J. SELVIN
BY
Roland A. Anderson
Attorney

Patented Aug. 4, 1953

2,647,557

UNITED STATES PATENT OFFICE 2,647,557

HEAT SEALING APPARATUS

Gerald J. Selvin, Bronx, N. Y., assignor to the United States of America as represented by the United States Atomic Energy Commission Application July 25, 1950, Serial No. 175,804

4 Claims. (Cl. 154—42)

The present invention relates to a method and apparatus for sealing and cutting plastic tubing.

In radiochemical laboratories it is often necessary to transfer radioactive fluids between various types of measuring, processing and storage apparatus. The material used for carrying these fluids must be resistant to caustics, acids and some organic solvents. It must also be nonabsorptive. Tubing made of thermoplastic material is commonly used as it can be manufactured with the desired properties and is sufficiently flexible for equipment coupling purposes.

When the equipment is disassembled or a leak develops in the system it is necessary to remove or seal off the plastic tubing. As it would be highly undesirable to leave open tubing through which the radioactive fluids could flow, this tubing must be either sealed or sealed and cut off. Also, since the radioactivity of the fluid might be of such an intensity that it would be dangerous for personnel to operate close to the tubing it is necessary that the device for sealing the tubing be capable of operating at some distance therefrom. Any apparatus used must be highly mobile and maneuverable as the tubing to be sealed might be in a location inaccessible for employment of conventional heat sealing apparatus such as the commonly used relatively immobile clamps provided with heated jaws. The present invention provides a method and apparatus for carrying out these operations without the limitations imposed by the older conventional means heretofore used in this field.

It is accordingly an object of the present invention to provide a new and improved remotely operated sealer for plastic tubing.

Another object is to provide a new and improved apparatus for both sealing and cutting plastic tubing in one operation.

A further object is to provide a new and improved apparatus for sealing and cutting thermoplastic material and adapted for remote manual operation while affording safety for an operator when handling toxic or radioactive materials.

More particularly, a preferred embodiment of the invention consists of a support with a plurality of jaws mounted thereon. At least one of the jaws is movable with respect to the others. Heating elements are associated with at least one of the jaws and means are provided for establishing relative movement between the jaws.

The many objects and advantages of the present invention may best be appreciated by reference to the accompanying drawings, the figures of which illustrate apparatus incorporating preferred embodiments of the present invention and capable of carrying out the method of the invention.

In the drawings, Figure 1 is a perspective view of one embodiment of the invention.

Figure 2 is a cross-sectional view of the apparatus taken along the line 2—2 of Figure 1 with the plastic tubing shown in position for sealing.

Figure 3 is a transverse section through the plastic tubing after it has been sealed.

Figure 4 is a transverse section through the plastic tubing after it has been sealed and cut.

Figure 1:
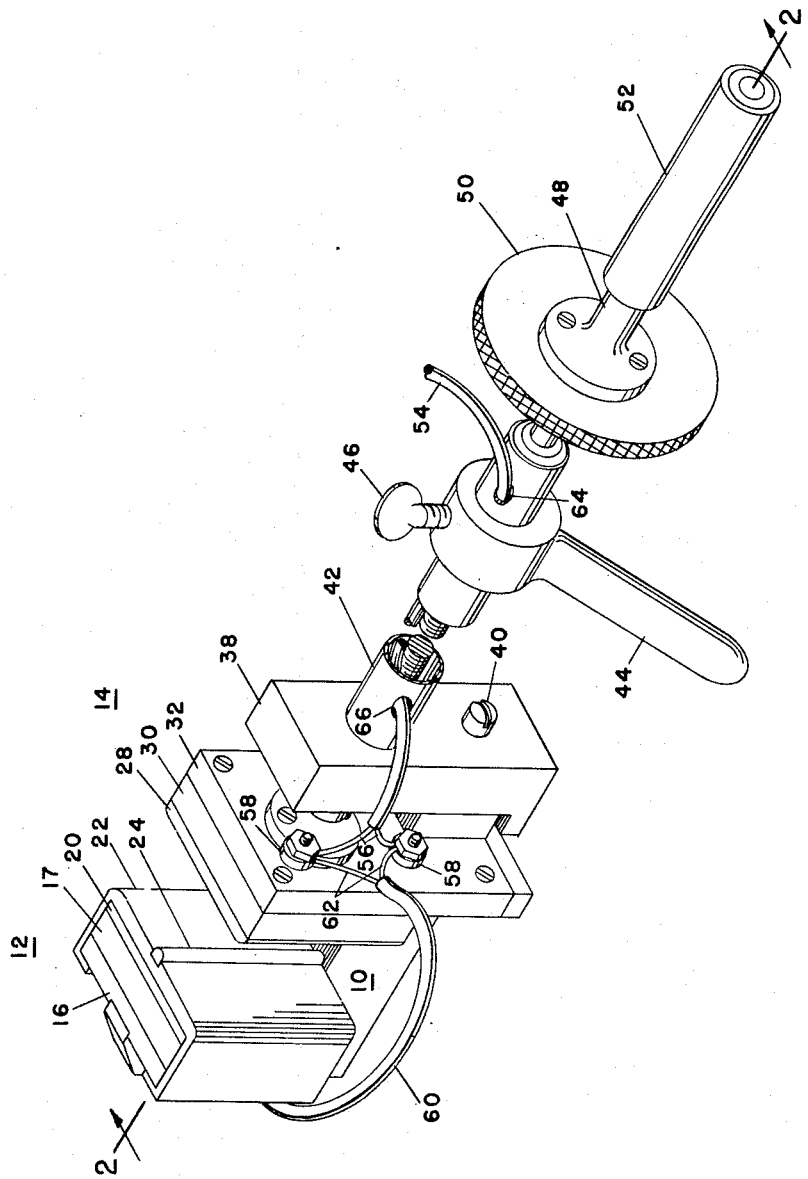

Referring to Figures 1 and 2, one embodiment of the apparatus will be described. A support 10 is provided with upstanding jaws 12 and 14. Jaw 12 is affixed to support 10 by means of screws 13 and is made up of a member 16, a heater block 17 made of heat resistant material, and a face plate 20. Contained within heater block 17 are coils of electrical resistance wire 18. The heater coils are supported by insulating pins 19. Mounted on jaw 12 is a removable head containing a raised nib 24 in the central portion thereof. Head 22 is attached to jaw 12 when it is desired to cut off the plastic tubing after it is sealed.

Jaw 14 is adapted to be moved with respect to support 10 and consists of a face plate 28, a heater block 30 and a vertical member 32. Jaw 14 contains coils of resistance wire mounted on insulating pins arranged as in jaw 12. Movably attached at one end to jaw 14, as by a suitable bearing housing, is a remotely controlled jaw-actuating rod 34 which is threaded for a portion of its length. This portion is adapted to be threaded through a fixed nut 36 mounted in an upstanding member 38 which in turn is affixed to horizontal support 10 as by a screw 40. Surrounding rod 34 for part of its length is an elongated tube 42 serving the dual purpose of a bearing for the rod 34 and a housing for electrical leads. An adjustable handle 44, the significant function of which will later become apparent, is secured to rod 34 by means of an adjustable thumb screw 46. Also secured to rod 34 is a tube 48 to which is attached a knurled adjusting wheel 50 and extending beyond which is mounted a rotatable sleeve 52, the handle 44, the wheel 50 and the sleeve 52 all being adapted to cooperate in the manual supporting and manipulation of the apparatus. In one convenient embodiment of the apparatus, for example, the overall length of the support 10 was about six inches whereas the rod 34 was in excess of three feet. While the precise length of the rod 34 is in no way critical, it may however generally be described as being substantially longer than the remainder of the apparatus.

Electrical connections to the heater coils may be made by means of cable 54 which contains conductors 56 that are attached to terminals 58 mounted on member 32. Terminals 58 extend through member 32 and insulating block 30 to the heater coils. Cable 60 containing conductors 62 is connected to similar terminals mounted on vertical member 16. These terminals are connected to the heater coils of jaw 12. The main power cable 54 preferably enters and emerges through holes 64 and 66 respectively in tube 42 to prevent the cable from interfering with the actions of the operator.

The operation of the above-described apparatus will now be explained. When a leak occurs in the tubing or equipment is to be disassembled, the apparatus is brought to the proper location. The power cord 54 is connected to a suitable power source. Sleeve 52 is held under one of the operator's arms while handle 44 is gripped with the hand to provide the proper support. The jaws 12 and 14 are placed on opposite sides of the tubing 70 with support 10 beneath it as shown in Figure 2. Adjusting wheel 50 is rotated to move jaw 14 closer to jaw 12. This is continued until the walls of the plastic tubing are firmly compressed between the jaws. When the heating coils reach the proper temperature the thermoplastic tubing between the jaws will begin to melt and fuse. This is continued until all of the tubing 70 between the jaws has fused and a good seal is obtained. If it is merely desired to seal the tubing, jaw 14 is moved away from jaw 12 and the operation is complete. For this purpose, movable head 22 would not have to be used and the sealing operation would be carried out between face plates 20 and 28 of jaws 12 and 14, respectively.

If it is desired to cut the tubing after sealing, head 22 is slid on to jaw 12 before beginning the sealing operation. The procedure is then carried out as described above except that jaws 12 and 14 are brought closer together after the tubing has been sealed, until the nib 24 parts the tubing. This results in two separate tubes each having one sealed end.

Figure 3 is a transverse section of the plastic tubing 70, after it has been sealed, showing the fused portion 72.

Figure 4 is a transverse section of the tubing after the fused portion 72 has been cut by nib 24, leaving two sealed ends 74 and 76.

Figure 5:
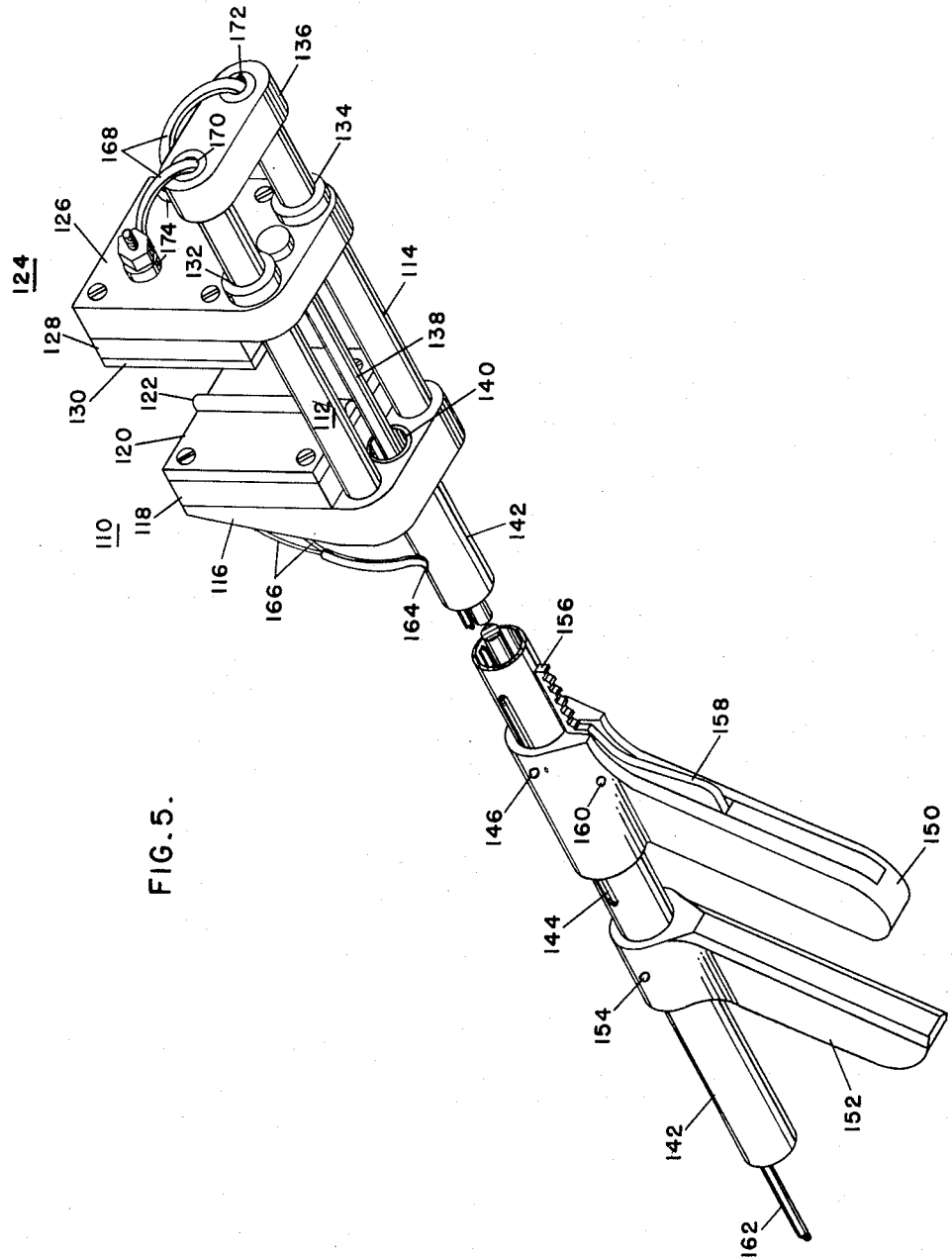
Figure 5 is a perspective view of another embodiment of the apparatus of the invention.

Referring to Figure 5, a second embodiment of the apparatus of the present invention is shown. This embodiment includes a fixed jaw 110 mounted on a support consisting of two tubes 112 and 114. Jaw 110 is made up of member 116, heater block 118 and face plate 120. Internally, jaw 110 is constructed similarly to fixed jaw 12 described in Figure 1.

In the central portion of face plate 120 is a raised nib 122. The nib is not part of plate 120 but is meshed with that plate in a conventional dovetail arrangement. Nib 122 is used when it is desired to cut the plastic tube after sealing. If it is merely desired to seal the tubing, the nib can be slid out from plate 120 and replaced by a dovetailed insert which is flush with the face of plate 120.

Confronting jaw 110 is a movable jaw 124. The movable jaw is made up of member 126, heater block 128 and face plate 130.

Tubes 112 and 114 each have one end attached to member 116. These tubes extend through holes 132 and 134, respectively, in jaw 124, and are connected at their other end by cross piece 136.

Attached to jaw 124 is a rod 138 which extends through hole 140 in member 116. Rod 138 is surrounded for part of its length by tube 142. One end of tube 142 is mounted in vertical member 116. In the periphery of tube 142 are two slots 144 (only one is shown) through which a dowel pin 146 is attached to rod 138. The ends of dowel pin 146 are mounted in a movable handle 150. A fixed handle 152 is mounted on tube 142 by means of dowel pin 154.

Attached to the underside of tube 142 is a rack 156. A trigger ratchet 158 is meshed with rack 156 and is supported in movable handle 150 by dowel pin 160. As indicated by the drawing, rack 156 is spaced a substantial distance from member 116 so that the operator may be protected from the contents of the tube to be sealed, as for example from the radioactivity of the fluid carried in such tubing.

Electrical power is supplied to the heating coils of the apparatus by means of cable 162. This cable is carried inside of tube 142 and emerges close to member 116 through hole 164. The cable contains conductors 166 which are connected to terminals (not shown) on member 116. The terminals extend through member 116 and heater block 118 to the heating coils in jaw 110. Also connected to the terminals on member 116 are conductors 168. These conductors extend through tubes 112 and 114 and emerge through holes 170 and 172, respectively. Conductors 168 are connected to terminals 174 to supply power to the heating coils in jaw 124. Since the electrical connections are made in this manner, there is no possibility of having the conductors interfere with the operation of the apparatus.

The operation of this embodiment of the apparatus will now be described. The device is placed so that the thermoplastic tubing is located between jaws 110 and 124 above tubes 112 and 114. The rearward extension of tube 142 is placed under the operator's arm while handle 152 is held firmly in one hand. Handle 150 is held in the other hand and may be moved towards handle 152 by depressing trigger ratchet 158 which disengages the handle from rack 156. This causes jaw 124 to move towards jaw 110 along tubes 112 and 124 by means of the connecting member 138. When the desired pressure on the plastic tubing is obtained, the trigger ratchet 158 is released and the heating coils in the jaws 110 and 124 are energized to perform the sealing operation as described above. After the operation is complete, the trigger ratchet 158 is depressed and handle 150 is moved away from handle 152. As mentioned above, this embodiment may be used for sealing or cutting, depending on the dovetailed insert 122 used in face plate 120.

It is apparent that the apparatus of the present invention is particularly well adapted for its purpose in view of its simplicity, light weight and arrangement of manually operated portions. It may be easily operated at a safe distance from the source of radioactivity. It can be held and used at any angle and can reach into small areas that might otherwise be inaccessible. A great need exists for such a highly mobile and maneuverable apparatus as a short time delay in stopping a leak in a radioactive system may lead to serious consequences.

Since many embodiments of the present invention might be made and since many other changes may be made in the preferred embodiments described above, it is to be understood that the foregoing description is to be interpreted as illustrative only and not in a limiting sense except as required by the appended claims.

I claim:

1. Heat sealing apparatus adapted for remote manual operation which comprises a support member for an article to be sealed, a plurality of jaws mounted on said support, at least one of said jaws being movable with respect to the others and to said article, means for heating at least one of said jaws, manual actuating means for said movable jaw disposed at a substantial distance therefrom and connected thereto by an elongated rod and a handle affixed to said rod closer to said actuating means than to said support, said handle being adapted for the manual holding of said apparatus during the sealing operation.

2. Heat sealing apparatus adapted for remote manual operation which comprises a support member for an article to be sealed, a pair of jaws mounted on said support having plane parallel confronting faces, at least one of said jaws being movable with respect to the other and to said article, means for heating at least one of said jaws, manual actuating means for said movable jaw disposed at a substantial distance therefrom and connected thereto by an elongated rod and a handle affixed to said rod closer to said actuating means than to said support, said handle being adapted for the manual holding of said apparatus during the sealing operation.

3. Heat sealing apparatus adapted for remote manual operation which comprises a support member for an article to be sealed, a pair of jaws mounted on said support having plane parallel confronting faces, at least one of said jaws being movable with respect to the other and to said article, means for heating at least one of said jaws, an elongated rotatable rod operatively associated with said movable jaw, a manually adjustable wheel affixed to said rotatable rod at a substantial distance from said jaw whereby rotation of said rod moves said movable jaw towards or away from said other jaw and a handle affixed to said rod closer to said wheel than to said jaw, said handle being adapted for the manual holding of said apparatus during the sealing operation.

4. Heat sealing apparatus adapted for remote manual operation which comprises a support member for an article to be sealed, a pair of jaws mounted on said support, said jaws having a pair of plane parallel confronting faces, at least one of said jaws being movable with respect to the other and to said article, means for heating at least one of said jaws, an elongated rod affixed to said movable jaw, a tubular member surrounding said rod for part of its length and containing a rack along the surface thereof, a first handle affixed to said rod at a substantial distance from said support and containing a trigger ratchet operatively associated with said rack and a second handle affixed to said tubular member whereby said movable jaw may be moved towards or away from said other jaw by depressing said trigger ratchet and moving said first handle along said tubular member.

GERALD J. SELVIN.

References Cited in the file of this patent

UNITED STATES PATENTS

| Number | Name | Date |
|---|---|---|
| 1,630,990 | Wagg | May 31, 1927 |
| 1,875,975 | Alm | Sept. 6, 1932 |
| 1,997,268 | Scharpf | Apr. 9, 1935 |
| 2,150,464 | Smith | Mar. 14, 1939 |
| 2,443,749 | Stunkel | June 22, 1948 |
| 2,514,197 | Grosen et al. | July 4, 1950 |
| 2,542,629 | Clawson | Feb. 20, 1951 |